April 19, 1938. W. I. McGOWAN ET AL 2,114,308
CONTAINER CLOSURE AND METHOD OF MANUFACTURING THE SAME
Original Filed Nov. 28, 1934
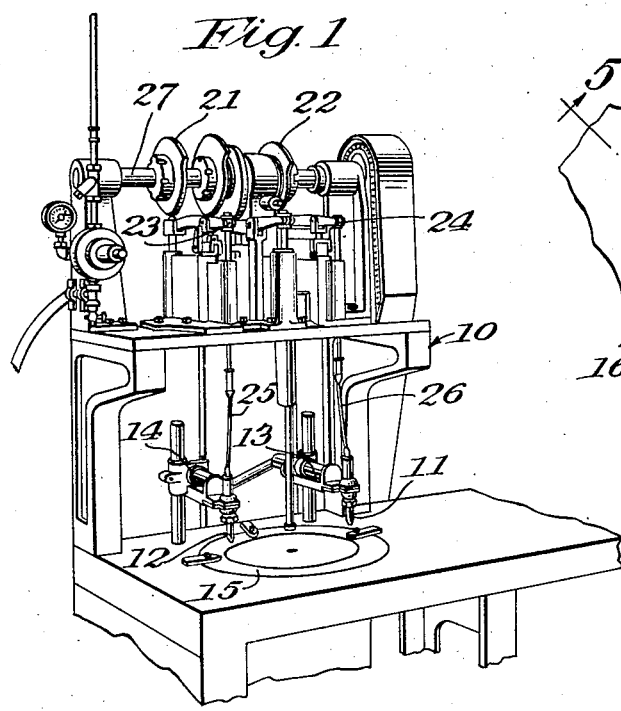
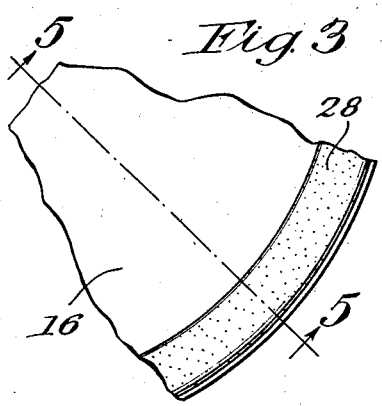
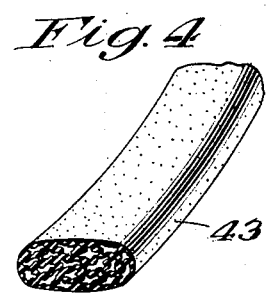
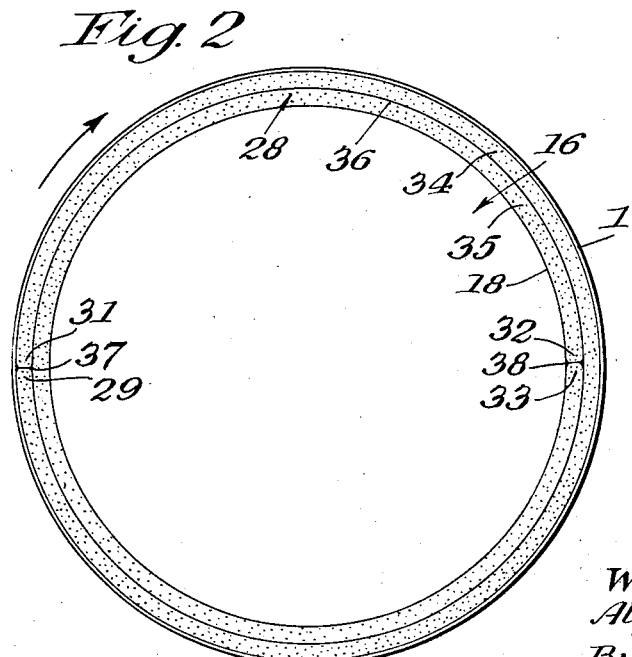
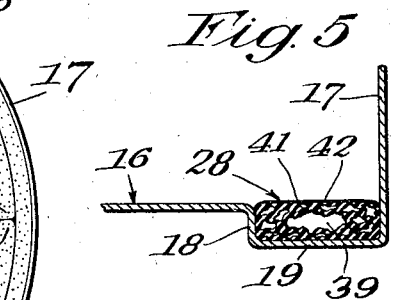
Inventors:
William I. McGowan and
Albert J. Puschin
By Theodore C. Browne
Attorney.

Patented Apr. 19, 1938

2,114,308

UNITED STATES PATENT OFFICE 2,114,308

CONTAINER CLOSURE AND METHOD OF MANUFACTURING THE SAME

William I. McGowan and Albert J. Puschin, Cambridge, Mass., assignors to Dewey and Almy Chemical Company, North Cambridge, Mass., a corporation of Massachusetts Application November 28, 1934, Serial No. 755,242
Renewed July 14, 1937

13 Claims. (Cl. 113—80)

This invention relates to container closures provided with sealing gaskets and to the process of manufacture of such closures.

The sealing element of a barrel, pail or kit is called upon to withstand severe service conditions. The containers are often filled with extremely heavy substances such as lead paint. Commonly, they are stacked in warehouse practice, and in stacking, some fall and their rims are often bent. In addition, the Interstate Commerce Commission regulations prescribe dropping of sand-filled containers through certain distances as a part of the acceptance test, yet under any condition of rough handling, the seal must remain tight. It is obviously impossible to impose upon barrel and pail manufacture such close manufacturing tolerances as maintain in the manufacture of cans. Accordingly, the sealing compound is called upon to fill wide gaps and to compensate for considerable surface irregularities.

Generally speaking, drum and pail covers have been supplied with molded gaskets or with a gasket formed from a rubber tube having its open ends joined by a short pin inserted into the bore. Molded gaskets are quite expensive. Tube gaskets also are expensive. In addition, both types must be stuck to the cover by an extra operation. The weak point of a tube gasket is the gap in continuity which causes the leaks to occur at that point frequently, particularly if by chance the joint is coincident with the welded side-seam of the container.

Previously, when attempts have been made to "line" such container ends with can sealing compound on lining machines, it has proved very difficult to apply enough compound and not either leave a gap at the ends where the flow of compound is started and stopped or to form a bump, due to the overlapping of the compound.

An object of the invention is to devise a method of applying sealing compound to container closures to form sealing gaskets thereon without the formation of gaps or bumps in the gaskets.

Another object is to produce a sealing gasket for container closures which adheres firmly to the closures, which has considerable mass or cross-sectional area of tubular or cellular structure, and which will readily deform elastically under the sealing pressure to produce an effective seal. A further object is to produce a sealing gasket which has embodied therein a lubricating ingredient to prevent scuffing or tearing of the gasket.

These and other objects will become apparent as the specification proceeds, and from the drawing, in which:

Figure 1 illustrates in elevation the essential portions of our improved lining machine;

Fig. 2 shows a top view of the cover immediately after the application of the compound;

Fig. 3 shows a sector of the cover after the heating operation;

Fig. 4 shows a small portion of our improved seal; and

Fig. 5 is a sectional view of the cover on the line 5—5 of Fig. 3.

In the following specification, we shall use the term "end" in its trade use to designate both covers and bottoms of containers.

Referring now to Fig. 1, the numeral 10 indicates generally our improved lining machine. Two nozzles 11 and 12 are mounted upon the adjustable brackets 13 and 14 in such a manner that they lie on a diameter of an end which, in the lining operation, is placed on the chuck 15. When, as in the case of a pail end, the gasket channel is wide, the adjustment of the nozzles 11 and 12 is such that either one, say for example, 12, delivers compound close to the lip 17 of the end 16, while nozzle 11 is adjusted to deliver compound closely adjacent to the wall 18 of the channel 19. Two cams 21 and 22 working through the rocker arms 23 and 24 and the pull rods 25 and 26 open valves in the nozzles 11 and 12. Preferably the nozzles should function simultaneously, and, accordingly, the angular relation of the cams 21 and 22 on the shaft 27 is the same. If the rotation of the chuck 15 is that shown by the arrow (Fig. 2), the sealing compound 28 delivered by the nozzle 12 begins its flow at the point 29 and ends at the point 31. Similarly, the inner nozzle 11 delivers compound beginning at the point 32 and ending at the point 33. There are thus two streams of viscous compound 34 and 35 with a common margin 36. The compound at the points 29, 31, 32 and 33 abuts but does not overlap. Almost immediately the compound merges into a single viscous mass 28 (Fig. 3) and the margins 36—36 and the termini 29, 31, 32, and 33 fade away. Hence, there is no need of an overlap to assure a closing of the gap, for the material at the points 37 and 38 in the full-sectioned adjacent ring of viscous compound presses against and flows into the joint. The two rings of sealing compound thus formed and treated as described below may be said to be fused or joined together to form a single ring or gasket.

When the channel is narrow the side by side arrangement of the delivered streams is not necessary. One stream may overlie another. Essentially, therefore, our invention may be practiced by supplying a full sectioned stream of compound closely adjacent to the termini of the second stream and which by pressure surface tension or capillarity contributes to close the joint.

As previously stated, it has not been feasible to line such covers after the manner of lining can ends because of the very large volume of sluggish compound which had to be handled. Prior compounds have responded poorly to changes in air pressure, and as the pressure was raised to force the delivery of a sufficient volume of compound to the channel, it squirted, spattered, and left poorly filled channels which produced gaskets with uneven cross sections. In manufacture, it was found impractical to deposit a larger amount of high solids liquid compounds which when dried down could produce a gasket more than .035 of an inch thick. We have overcome the thickness limitation and to a very considerable extent minimized the irregularity of the cross section even when our improved lining apparatus is not used by employing a compound, which instead of shrinking, enlarges its volume as it dries. A preferred example of such a composition follows:

| | Parts |
|---|---|
| Rubber solids (Revertex) | 28 |
| Fillers (Barytes) | 30 |
| Casein | 1½ |
| Sulphur | ½ |
| Accelerator (D. P. G.) | 3/10 |
| Activator (zinc oxide) | 2/10 |
| Paraffin wax | 4 |
| Water to make | 100 |

Casein may be made up as an ammonia solution and added directly to the concentrated latex (Revertex), then, with active stirring, with paraffin wax is run in. We prefer to mill the fillers, sulphur, accelerator and activator together to form a well comminuted ball mill batch and we then add this to the latex dispersion. The compound may be considered as having rubber and casein or its equivalents in the solid phase as suspensoids therein. When oil replaces paraffin, an oil-in-water emulsion is formed which carries the rubber and casein as solid phase suspensoids therein. Such a compound flows well and handles freely in our improved lining machine.

After the lining operation, the covers are immediately placed in an oven and held at 200 to 230° F. for from 2 to 3 hours. As the heat is first applied, a film or skin of casein which is quite tough quickly forms on the exposed surface, then as the water is vaporized in the interior of the compound, the steam presses outwardly against the film. If the temperature be high, for example, between 220° and 230° F., a tubular gasket is formed which may approach a half an inch in thickness, although we have found that .375 satisfies most requirements, but at lower heats a sponge rubber gasket is formed which is, of course, somewhat thinner. Dut to the presence of the accelerator and activator the rubber cures in this same temperature range and during this same time. For certain lining requirements, however, a curing type compound is unnecessary. Then, the sulphur and accelerators are omitted.

We consider it essential that a film forming agent be incorporated since otherwise the latex will dry down as a dense but badly blistered mass. Casein is but one such substance; others are glue, pectin, dextrine, starch, glucose, gelatin, gum arabic and compounds related to these. In short, any recognized film forming agent compatible with latex is suitable. We have found also that under certain conditions soap, starch modification products, such as starch-acetate, and sodium-silicate also form sufficiently dense and impervious films.

Occasionally, the concentration of the film forming agent at the surface causes serious sticking or adhesion to the container. Accordingly, we have added paraffin, cerasin or a compatible lubricating substance such as castor oil to the compound. In the finished product, these lubricating substances penetrate the surface, lubricate the joint between the gasket and the container and allow easy removal of the cover.

Figure 4 illustrates the cross section of the spongy structure assumed by the rubber gasket 43 when the compound is heated from 200 to 220° F. As shown, the two independent streams have completely merged to produce a single unitary rubber gasket.

Figure 5 is a sectional view showing the gasket in place in the channel 19 of the end 16. This figure shows the tubular form which the gasket assumes when the compound is heated quickly between 220 to 230° F. and shows the irregular bore 39 surrounded by a pore filled mass 41. The skin 42 which forms upon the upper surface of the gasket is smooth, continuous and quite glassy in appearance.

The machine herein illustrated and described shows only one form of apparatus for carrying out the method herein claimed, but it will be understood that the mechanical operations involved may be performed by other machines or by hand, if desired.

What we claim is:

1. That process of forming a container closure which includes adding a surface film forming agent to an aqueous dispersion of rubber, applying the compound so formed to a container end, causing a film to form upon the surface of the compound and vaporizing the water content of the compound against the restraint imposed by the surface film.

2. That process of forming container closures which comprises placing continuous streams of sealing compound in the same channel of a container end to form rings of compound having displaced termini, allowing the streams to merge, causing a vapor retaining skin to form upon the exposed surface of the compound, vaporizing a portion of the liquid in said compound and causing the vapor to react against the restraint imposed by the film thereby producing a cellular container seal.

3. The method of lining a container closure with sealing compound which consists in depositing a ring of compound near the periphery of the closure, and depositing a second ring of compound contiguous with the first ring and with the termini of the second ring displaced from the termini of the first ring.

4. The method of forming a sealing gasket on a container closure which consists in depositing a stream of sealing compound upon the closure to form a closed ring of sealing compound, and depositing a second stream of sealing compound upon the closure to form a second closed ring contiguous with the first closed ring and having its termini displaced from the termini of the first ring.

5. The method of forming a sealing gasket upon a container closure which consists in depositing upon said closure a plurality of concentric rings of sealing compound containing a vaporizable liquid and a film forming agent, said rings having their termini displaced from each other and being deposited in contiguous relation whereby they merge into each other to form a single compound ring, heating said compound ring to form a vapor retaining skin upon the surface thereof, and vaporizing a portion of the liquid in said compound against the restraint imposed by said skin, thereby rendering the interior of said ring cellular in character.

6. The method of forming a hollow ring gasket upon a container closure which consists in depositing upon said closure a plurality of concentric rings of sealing compound comprising an aqueous dispersion of rubber containing a surface film forming agent, said rings being deposited in contiguous relation whereby they merge into each other to form a single compound ring, heating said compound ring to form a vapor retaining skin upon the surface thereof, and vaporizing a portion of the water content of the compound against the restraint imposed by said skin to expand the ring and thereby render the interior of the ring hollow.

7. The method of forming a sealing gasket on a container closure from a sealing compound containing a vaporizable liquid and a surface film forming agent which consists in depositing a stream of sealing compound upon the closure to form a closed ring of sealing compound, depositing a second stream of sealing compound upon the closure to form a second closed ring having its termini displaced from the termini of the first ring and arranged contiguous with the first ring whereby said rings merge into each other to form a single compound ring, heating said compound ring to form a vapor retaining skin upon the surface thereof, and vaporizing a portion of the liquid in said compound against the restraint imposed by said skin, thereby rendering the interior of said ring cellular in character.

8. The method of forming a lubricated sealing gasket upon a container end which consists in depositing upon said end an annular ring of sealing compound containing a vaporizable liquid and a film forming agent and a dispersed lubricant, heating said ring of compound to form a vapor retaining skin upon the surface thereof, and vaporizing a portion of the liquid in said compound against the restraint imposed by said skin, thereby rendering the interior of said ring cellular in character.

9. The method of forming a sealing gasket upon a container end which consists in depositing upon said end a plurality of concentric portions having their ends angularly displaced relative to each other, and fusing together said portions to form a single annular gasket.

10. The method of forming an annular gasket upon a container end which consists in depositing upon said end a plurality of concentric rings of sealing compound arranged in contiguous relation and having their ends angularly displaced relative to each other, and fusing together said concentric rings to form a single annular gasket.

11. A container closure having an annular sealing gasket thereon formed of a plurality of concentric rings of sealing compound arranged in contiguous relation with their ends angularly displaced relative to each other, said rings being fused together to form a single annular gasket.

12. A container closure comprising an end, a gasket in said end formed of cellular expanded rubber having a smooth, exposed, exterior surface and a dispersed lubricant in the body of said gasket capable of maintaining a lubricating film upon said surface.

13. In combination, a container end and a sealing gasket therein which gasket consists of a plurality of concentric portions fused together, the ends of said portions being angularly displaced relative to each other.

WILLIAM I. McGOWAN.
ALBERT J. PUSCHIN.